Patented Mar. 12, 1935

1,993,971

UNITED STATES PATENT OFFICE 1,993,971

QUINONE-OXIME PIGMENT

Donald E. MacQueen, Hillside, N. J., assignor to Krebs Pigment & Color Corporation, Newark, N. J., a corporation of Delaware No Drawing. Application March 24, 1932, Serial No. 601,058

12 Claims. (Cl. 134—58.5)

The present invention relates to metal complexes of quinone-oximes, particularly of nitroso-betanaphthol, useful as lake pigments.

Green lake pigments have been made heretofore by the action of iron salts upon alpha-nitroso-betanaphthol or its bisulfite compound. While such pigments possess good fastness to light and alkalies, they are hard in texture and difficult to disperse in printing ink media.

Complex, strongly colored compounds of nitroso-betanaphthol with metals other than iron are also well known in the arts; they are of different shades but of otherwise similar properties. Cobalt complexes are for instance red, those of nickel and chromium are brown. These highly colored complexes of nitroso-betanaphthol are obtained from such metals which are able to react in more than one valency stage and these metals are called herein "color forming metals". Such metals are known to the art by virtue of their use as mordants for the application of quinone-oxime dyestuffs to textiles. Examples of such metals are iron, cobalt, nickel, chromium, copper, etc. It is necessary that the amounts of these metallic reactants which are used in the formation of the complex should not exceed the ratio of one atom of the metal to three molecules of nitroso-betanaphthol. Otherwise, the tinctorial properties of the pigment will be damaged.

On the other hand, nitroso-betanaphthol is able to form only slightly colored salts with metals of the second and third group of the periodical system, which salts, however, have none of the properties which would make them available for pigment purposes.

I have found that the highly colored complexes of nitroso-betanaphthol are able to react with compounds of the metals of the second and third group of the periodical system to form multi-metal complex pigments which have cleaner and brighter shades of substantially the same color as the original complex and which, particularly when the substances are associated with a water insoluble compound of the additional metal with a wetting agent, have a much softer texture and greatly improved pigment properties, and my invention comprises the novel lake pigments which comprise the complex metal compounds of nitroso-betanaphthol in which more than one metal is present in the pigment, one of said metals having the properties of reacting in more than one valency stage, another of said metals being chosen from the metals of the second and third group of the periodic system of elements. My invention further comprises the processes of making said pigments.

Analytical data clearly show that the secondary metal, i. e. that of the second and third group of the periodic system, is part of the pigments of my invention. It is, however, not clearly understood how this additional amount of metal is attached to the nitroso-betanaphthol. Experimental evidence tends to show that it replaces part of the color forming metal in the complex; it is also possible that it replaces part of the salt forming alkali metal associated with the precipitated pigment; it also appears probable that the complex of 1 atom of the color forming metal with 3 mols of nitroso-betanaphthol is capable of attaching, through secondary valencies or otherwise, additional metal of a different type. It is further possible that all three types of reaction may take place.

The colored metal complex pigments of nitroso-betanaphthol have in the prior art commonly been precipitated in the presence of Turkey red oil which seems to be essential for the production of workable pigments. Similarly, I prefer to precipitate my multi-metal complex pigments in the presence of a wetting out agent, which term is used herein to include surface tension reducing substances such as fatty acid soaps, rosin soaps, soaps of sulfonated oils or of sulfonated abietene, sulfonated alkyl naphthalene sulfonic acids and others. Such wetting out agents form water insoluble salts with the secondary metals, which then precipitate upon the metal complex formed and contribute to the softness and easy dispersibility of the finished pigments.

The colorless metal compound of the wetting out agent and the pigment complex form possibly a solid solution in which the complex retains its full color strength.

One of the great advantages of the multi-metal complex pigments of my invention, over the single color forming metal complexes of the prior art, is that the additional metal introduced not only improves the color without weakening it, but it also produces an increased yield in weight from the same amount of nitroso-betanaphthol.

My multiple metal complex pigments can be produced in different manners. I can, for instance, add to the solution of nitroso-betanaphthol bisulfite compound the requisite amount of a compound of the color forming metal, then add the zinc or other secondary metal compound and finally precipitate the pigment with a weak alkali. I can also precipitate the iron or other color forming complex first and add to a suspension of the single metal complex a compound of the secondary metal and then precipitate the reaction product. In an alternate procedure I add first a certain amount of a compound of one of the secondary metals to a solution of nitroso-betanaphthol, I then add the color forming metal and precipitate the pigment. Furthermore, I may also add the compounds of the two metals simultaneously to the solution of nitroso-betanaphthol and then precipitate the pigment.

There is a difference in amount of metal that I can use according to the different manners of preparing the multi-metal complex pigments. In the procedures where I react first with the secondary metal upon the nitroso-betanaphthol bisulfite compound and complete the pigment formation by subsequently adding the color forming metal compound, or where the two metals are added simultaneously, the sum of the two metals should not exceed the ratio of 1 atom of metal to 3 molecules of nitroso-betanaphthol and the amount of the color forming metal should be at least one-half of the total.

When I react with the secondary metal upon the preformed colored complex, either before or after precipitation of the pigment, I use the color forming metal in an amount not exceeding the above ratio of 1:3 and can subsequently use any desired amount of the secondary metal.

Among the metals of the second and third group of the periodic system useful in the preparation of my novel multi-metal complex pigments, I found zinc to produce the most useful pigments particularly when used in connection with the iron complex of nitroso-betanaphthol, but I also obtained valuable pigments from cobalt, nickel or chromium complexes with magnesium, aluminum, barium, strontium or calcium, etc. compounds.

In general, I use a water soluble compound of the secondary metal but I found that in the case of zinc, zinc oxide or zinc hydroxide can be advantageously used, particularly when the reaction mixture contains bisulfite or sulfite, either added on purpose or present in excess from the reaction in which the nitroso bisulfite ester is formed.

I also found that the addition of an organic acid such as oxalic, tartaric, citric acid, etc., or their salts, to the bisulfite derivative of alpha-nitroso-betanaphthol will overcome, at least in part, the undesirable effects of an excess of the color forming metal intended to form the complex. Furthermore, the presence of such organic acid effects slight improvements in the brightness and strength of the pigment prepared under the optimum conditions as regards the amount of metallic precipitant.

The following examples will serve to illustrate the nature of my invention but are not to be taken in any way as limitations to the same.

*Example 1*

144 parts (1 mol.) of beta-naphthol are dissolved at 60–65° C. in 550 parts of water containing 41.5 parts (1.038 mols.) of caustic soda (100%). The solution is diluted with 425 parts of water and 1000 parts of ice are added so as to cool to 0° C. or below. A solution of 72 parts of sodium nitrite 96% (1 mol.) dissolved in 300 parts of water is added to the cold beta-naphthol solution.

A solution of 138 parts of sulfuric acid (66° Bé.) (1.312 mols.) in 250 parts of water is prepared and, after cooling, is added with good agitation below the surface of the solution of beta-naphthol and nitrite. The rate of addition of the acid is regulated so as to require 1½ hours and the temperature is maintained at 0° C. by the addition of further amounts of ice as needed. The final reaction should be acid to Congo red and should also show an excess of nitrous acid. The stirring is continued for one hour at 0° C. or lower after the acid has been added.

The yellow precipitate of alpha-nitroso-beta-naphthol is filtered off and washed with 20% salt solution until the washings are neutral to Congo red and show no excess nitrous acid. The yield of alpha-nitroso-betanaphthol is approximately 90% of the theoretical amount.

The washed alpha-nitroso-betanaphthol is suspended in 4500 parts of water and stirred until a smooth suspension is obtained. A solution of 134 parts of commercial sodium bisulfite 60–62% $SO_2$ (1.29 mols) in 1100 parts of water is added and the suspension warmed to 40° C. in 20 minutes with stirring. The resulting brown solution of the bisulfite derivative is filtered and the small amount of tarry brown precipitate washed with 100 parts of water.

To the clear brown filtrate is added a solution of 7.2 parts of oxalic acid (0.057 mols) in 200 parts of water. This is followed by the addition of a solution of 75 parts of copperas crystals, $FeSO_4.7H_2O$ (0.27 mols) in 400 parts of water. The copperas is added in 20 minutes at a temperature of 25° C. A suspension of 25.5 parts of Turkey red oil (70%) in 100 parts of warm water (40° C.) is added and stirring continued for 15 minutes thereafter.

A suspension of 23 parts of finely-divided zinc oxide (0.283 mols) in 75 parts of water is then added to the clear solution and stirring continued for 15 minutes. A blue coloration which develops becomes green after stirring.

The green pigment is precipitated by adding in 10 minutes at 25° C. a solution of 260 parts of soda ash (2.45 mols) in 4500 parts of water. Stirring at 25° C. is continued for 30 minutes, then the temperature is raised uniformly to 40° C. in 1 hour. The precipitated green pigment is filtered and washed until the washings are neutral to red litmus. The pigment is dried at 60–65° C. for 12–18 hours. The yield is 230 parts of a green pigment which possesses the soft texture and the other advantageous properties described above.

*Example 2*

A solution of the bisulfite derivative of alpha-nitroso-betanaphthol is prepared from 144 parts of betanaphthol as described in Example 1.

The procedure as outlined in Example 1 is followed throughout except that the amount of Turkey red oil (70%) is reduced from 25.5 parts to 12 parts.

The yield is 220 parts of a green pigment which is similar to that of Example 1, except for a somewhat bluer undertone and slightly increased strength.

*Example 3*

As in Example 1, 144 parts of betanaphthol are nitrosated and converted to the soluble bisulfite derivative.

The procedure outlined in Example 1 is followed throughout, except that the amount of Turkey red oil (70%) is increased to 38 parts and the amount of zinc oxide is likewise increased from 23 parts to 34.5 parts.

The yield is 250 parts of a green pigment which is similar to that of Example 1 tinctorially and only slightly weaker.

The following Example 4 shows the process in which the nitroso-betanaphthol is first allowed to react with zinc and the iron compound added after formation of the zinc complex. The total amount of the two metals is less than the 1:3 ratio.

Example 4

A solution of the bisulfite compound of alpha-nitroso-betanaphthol from 144 parts of beta-naphthol is prepared as in Example 1.

A solution of 7.2 parts of oxalic acid in 200 parts of water is added to the above solution. A suspension of 8.6 parts of finely divided zinc oxide (0.106 mols) in 30 parts of water is then added. Stirring is continued for 30 minutes. Then 25.5 parts of Turkey red oil (70%) suspended in 100 parts of water are added and stirring continued 15 minutes. A solution of 44.2 parts of copperas, $FeSO_4.7H_2O$ (0.159 mols) in 300 parts of water is next added in 20 minutes at 25° C. After stirring 10 minutes, a solution of 260 parts of soda ash in 4500 parts of water is added in 10 minutes at 25° C.

The preparation is finished as described in Example 1. The yield is 170 parts of a green pigment of soft texteure which is similar also to that of Example 1 in other respects.

Example 5

To a solution of the bisulfite compound, prepared from 144 parts of betanaphthol as in Example 1, is added 7.2 parts of oxalic acid, dissolved in 200 parts of water. A solution of 75 parts of copperas ($FeSO_4.7H_2O$) in 400 parts of water is added to the solution of the bisulfite derivative in 20 minutes at 25° C. A suspension of 25.5 parts of Turkey red oil (70%) in 100 parts of warm water (40° C.) is then added and stirring is continued for 15 minutes.

A solution of 70 parts of magnesium sulfate, $MgSO_4.7H_2O$, (0.283 mols) in 250 parts of water is added in 10 minutes and stirring continued 15 minutes. 200 parts of soda ash are dissolved in 4500 parts of water and added in 10 minutes at 25° C.

The pigment is finished as described in Example 1. The yield is approximately 180 parts of a green pigment which is distinctly bluer than that of Example 1, but of the same soft texture.

Example 6

A solution of 7.2 parts of oxalic acid in 200 parts of water is added to the solution of the bisulfite compound of alpha-nitroso-betanaphthol as prepared from 144 parts of beta-naphthol as in Example 1.

In 20 minutes at 25° C. a solution of 78 parts of cobaltous nitrate, $Co(NO_3)_2.6H_2O$ (0.268 mols) in 300 parts of water is added. Then 25.5 parts of Turkey red oil (70%) in 100 parts of water at 40° C. are added and stirring continued for 15 minutes. A suspension of 23 parts of finely divided zinc oxide in 75 parts of water is added and stirring continued again for 15 minutes. A solution of 260 parts of soda ash in 4500 parts of water is added in 10 minutes at 25° C. The precipitated pigment is stirred 30 minutes at 25° C. and filtered, then washed alkali-free by test on litmus. The pigment is dried at 60–65° C. for 12–18 hours.

The yield is approximately 212 parts of red pigment which is very soft in texture.

Example 7

A solution of the bisulfite compound of alpha-nitroso-betanaphthol is prepared from 144 parts of betanaphthol as described in Example 1. A solution of 7.2 parts of oxalic acid dissolved in 200 parts of water is added to the bisulfite-ester solution.

A solution of 54 parts of crystallized ferric chloride, $FeCl_3.6H_2O$, (.200 mols) in 300 parts of water at 25° C. is added in 20 minutes to the solution of the bisulfite compound. A suspension of 25.5 parts of Turkey red oil in 100 parts of water at 40° C. is then added to the mixture and the whole stirred for 15 minutes. A solution of 46 parts of zinc sulfate, $ZnSO_4$, (0.286 mols) dissolved in 200 parts of water is added in 10 minutes, followed by 10 minutes additional stirring. A solution of 260 parts of soda ash in 4500 parts of water is added in 10 minutes at 25° C.

The preparation is finished as in Example 1. The yield is about 178 parts of green pigment similar to that of Example 1.

The next two examples illustrate the action of a secondary metal upon a preformed, precipitated iron pigment.

Example 8

A solution of the bisulfite derivative of alpha-nitroso-betanaphthol is prepared from 144 parts of betanaphthol as in Example 1. To this is added a solution of 7.2 parts of oxalic acid in 200 parts of water.

The addition of 75 parts of copperas

($FeSO_4.7H_2O$)

dissolved in 400 parts of water is made in 20 minutes at 25° C. Following this, a suspension of 25.5 parts of Turkey red oil (70%) in 100 parts of water (40° C.) is added and the somewhat turbid solution is stirred for 15 minutes. The pigment is then precipitated by the slow addition of 260 parts of soda ash dissolved in 4500 parts of water. The reaction is stirred at 25° C. for 30 minutes, then warmed to 40° C. in 1 hour.

As in Example 1, the pigment is filtered and washed until the washings show no change on brilliant yellow test paper. The press cake is then reslurried with 5000 parts of water at 25° C. and a solution of 80 parts of barium chloride in 500 parts of water is added in 10 minutes. After stirring 15 minutes, the pigment is again filtered, washed free of chlorides and dried at 60–65° C. for 12–18 hours.

The yield is 180 parts of green pigment of good strength and tinctorial properties, similar to that of Example 1.

Example 9

To 400 parts of the paste form (24.6% total solids) of the green iron pigment as prepared in the first part of Example 8 are added 4000 parts of water at 25° C. After warming to 40° C., a solution of 240 parts of sodium bisulfite (60–62% $SO_2$) in 1000 parts of water is added and stirring carried on for 10 minutes.

A suspension of 16 parts of Turkey red oil 70% in 100 parts of water is added to the pigment suspension prepared as above. Stirring is continued for an additional 10 minutes, and a suspension of 12 parts of finely divided zinc oxide in 100 parts of water is added, followed by a further 15 minutes of stirring. (23.9 parts of zinc sulfate may be used in place of the zinc oxide and sodium bisulfite.) A solution of 80 parts of soda ash in 800 parts of water is added in 10 minutes at 40° C. After a final stirring period of 30 minutes, the color is filtered, washed neutral to litmus and dried for 12–18 hours at 60–65° C.

The yield is 105 parts of a green pigment which possesses a soft texture and the other desirable characteristics of the pigment of Example 1.

Example 10

According to the procedure outlined in Example 1, 144 parts of betanaphthol are nitrosated and converted to the soluble bisulfite derivative. A solution of 7.2 parts of oxalic acid in 200 parts of water is added to the bisulfite derivative. A solution containing 8.7 parts of zinc sulfate (0.054 mols) and 60 parts of copperas crystals (0.216 mols) in 400 parts of water is added in 20 minutes at 25° C. A suspension of 25.5 parts of Turkey red oil (70%) in 100 parts of water is then added and stirring continued for 15 minutes. The pigment is precipitated by the slow addition of 260 parts of soda ash dissolved in 4500 parts of water.

The preparation is finished as in Example 1. The yield is about 180 parts of a green pigment slightly yellower in shade than that of Example 1 but otherwise similar in properties.

The composition of the pigments can, in the case of iron-zinc complexes, be analyzed in a qualitative manner. By extraction with ammonium chloride solution the inorganic zinc compounds precipitated are removed. Trichlorethylene or similar solvents dissolves the zinc salts of Turkey red oil and the zinc remaining in the pigment after these extractions is assumed to be chemically combined with the complex.

This method gave positive results for zinc as inorganic compounds, for zinc soap and chemically combined zinc.

A particular advantage in the use of pigments prepared according to this invention lies in their greatly improved softness of texture in comparison with pigments prepared by prior art methods, as indicated by the relative ease of grinding with lithographic varnish on an ink mill. Furthermore, prints made from the respective inks show that the ink from the pigment prepared according to my improved process produces a higher finish of printing tone and possesses generally improved printing qualities that are usually associated with pigments of distinctly soft texture. In addition, the improved pigment is brighter and cleaner than the pigments of the prior art. By virtue of the above characteristics, the products of this invention form pigments of good working qualities for the printing ink industry.

Further advantages of the improved type of pigment lie in its greater tinting strength and increased yield amounting to as much as 25% in both cases. Advantages are also found in more consistent results in the manufacturing operation by the improved process in comparison with prior art methods.

These pigments also exhibit the excellent fastness to light and alkalies characteristic of the pigments of the prior art. Furthermore, they offer additional distinct advantages in working properties for the manufacture of wall paper and coated papers in general.

I claim:

1. As a pigment, a complex metal compound of nitroso-betanaphthol in which more than one metal is present in the pigment, one of said metals being chosen from the group of metals consisting of iron, cobalt, nickel, chromium and copper, another of said metals being chosen from the group of metals consisting of magnesium, calcium, strontium, barium, aluminum and zinc.

2. In a process of preparing a pigment the steps of reacting upon a solution of the bisulfite compound of nitroso-betanaphthol with a compound of iron and with a compound of zinc.

3. In a process of preparing a green pigment, the steps of reacting upon a solution of the bisulfite compound of nitroso-betanaphthol with an iron salt in an amount not exceeding 1 atom of iron to 3 molecules of said nitroso-compound, and reacting upon the reaction product with a zinc salt.

4. In a process of preparing a green pigment, the steps of adding an iron salt to a solution of the bisulfite compound of nitroso-betanaphthol, said iron salt being in an amount not exceeding 1 atom of iron for each 3 molecules of said nitroso-compound, adding a zinc compound to said solution in the presence of Turkey red oil and then precipitating the pigment by addition of an alkali.

5. In a process of preparing a green pigment the step of suspending the iron complex of nitroso-betanaphthol in water, adding Turkey red oil and zinc compound to said suspension and precipitating the pigment by addition of sodium carbonate.

6. As a pigment a complex metal compound of nitroso-betanaphthol in which iron and zinc are present in the complex.

7. As a pigment a complex metal compound of nitroso-betanaphthol in which iron and zinc are present in the complex, the amount of iron in the complex being not greater than corresponds to the ratio of 1 atom of iron to 3 molecules of nitroso-betanaphthol.

8. In a process of preparing a multi-metal complex of nitroso-betanaphthol containing two types of metals, one type representing the metals having the properties of reacting in more than one valency stage and the other one representing the metals of the second and third group of the periodic system of elements, the steps of reacting upon a solution of the bi-sulfite compound of nitroso-betanaphthol with a compound of a metal of one of said types and reacting upon the reaction product with a compound of a metal of the other aforesaid type, at least one of the reacting components of the second reaction being in solution.

9. In a process of preparing a multi-metal complex of nitroso-betanaphthol containing two types of metals, one type representing the group consisting of iron, cobalt, nickel, chromium and copper, the other one representing the metals magnesium, calcium, strontium, barium and zinc, the steps of reacting upon a solution of the bi-sulfite compound of nitroso-betanaphthol with a compound of a metal of one of said types and reacting upon the reaction product with a compound of a metal of the other aforesaid type, at least one of the reacting components of the second reaction being in solution.

10. In a process of preparing a multi-metal complex of nitroso-betanaphthol containing two types of metals, one type representing the group consisting of iron, cobalt, nickel, chromium and copper, the other one representing the metals magnesium, calcium, strontium, barium and zinc, the steps of reacting upon a solution of the bi-sulfite compound of nitroso-betanaphthol with a compound of a metal of one of said types, reacting upon the reaction product with a compound of a metal of the other aforesaid type, at least one of the reacting components of the second reaction being in solution and precipitating the complex by addition of an alkali.

11. The process of claim 10 when performed in the presence of a wetting out agent.

12. The process of claim 10 when performed in the presence of an organic acid.

DONALD E. MACQUEEN.